United States Patent [19]

Matsuda et al.

[11] Patent Number: 4,642,717
[45] Date of Patent: Feb. 10, 1987

[54] MECHANISM FOR LIFTING AND LOWERING MAGNETIC HEAD IN MAGNETIC RECORDING AND REPRODUCING DEVICE

[75] Inventors: Shinichi Matsuda; Kazuhisa Seki, both of Saitama, Japan

[73] Assignee: Fuji Photo Optical Co., Ltd., Japan

[21] Appl. No.: 712,664

[22] Filed: Mar. 18, 1985

[30] Foreign Application Priority Data

Mar. 30, 1984 [JP] Japan .................................. 59-63041

[51] Int. Cl.⁴ .............................................. G11B 5/54
[52] U.S. Cl. ..................................... 360/105; 360/97; 369/261; 358/906
[58] Field of Search ................... 360/105, 104, 97, 99; 358/906, 310, 335; 369/219, 221, 261

[56] References Cited

U.S. PATENT DOCUMENTS 4,396,963  8/1983  Wright .............................. 360/105 X
4,415,940 11/1983  Becker .................................. 360/99
4,504,879  3/1985  Toldi et al. .......................... 360/105

FOREIGN PATENT DOCUMENTS 57-201696 12/1982  Japan .

Primary Examiner—John H. Wolff

[57] ABSTRACT

A mechanism for lifting and lowering a magnetic head into and out of contact with a magnetic medium such as a magnetic sheet includes at least one guide shaft rotatably supported on a frame and having an eccentric portion. A magnetic head carriage supports a magnetic head thereon and is slidably movable along the guide shaft toward a recording/playback position, the magnetic head carriage having an end held in engagement with the eccentric portion of the guide shaft. A driver mechanism is mounted on the frame for rotating the guide shaft to cause the eccentric portion to displace the magnetic head toward a backing plate with a magnetic medium such as a magnetic sheet interposed therebetween.

6 Claims, 4 Drawing Figures

MECHANISM FOR LIFTING AND LOWERING MAGNETIC HEAD IN MAGNETIC RECORDING AND REPRODUCING DEVICE

BACKGROUND OF THE INVENTION

1. Field of the Invention

The present invention relates to a mechanism for lifting and lowering a magnetic head in a magnetic recording and reproducing device in which a magnetic sheet is employed as a recording medium.

2. Description of the Prior Art

Electronic photographic cameras which have recently been proposed in the art operate by reading a still image with an imaging device to convert the read image into video signals and then recording the video signals on a magnetic sheet with a magnetic recording device. The magnetic sheet stores the video signals representing one picture scene by recording them on concentric tracks. When the magnetic sheet is played back in a reproducing device, the stored video signals are reproduced so as to be observed as a visible image through an output device such as a cathoderay tube or a printer.

The magnetic recording and reproducing device of the type described above has a jacket holder for accommodating a magnetic sheet jacket with the magnetic sheet rotatably housed therein. The jacket holder is movable into a loading position of the device by placing the magnetic sheet jacket into the jacket holder and then closing a door. When the jacket holder reaches the loading position, the magnetic sheet is mounted on a motor-driven spindle and a magnetic head is brought into contact with the magnetic sheet. In the recording or playback mode, the magnetic sheet is rotated by the spindle at a high speed such as 3,600 rpm, for example, while the video signals are magnetically recorded or reproduced by the magnetic head.

For good magnetic recording and reproducing of video signals, it is necessary that the magnetic sheet and the magnetic head be stably held in contact with each other. The magnetic sheet is extremely thin, and could not stay in contact with the magnetic head if the magnetic head were simply pressed against the recording surface of the magnetic sheet. It has been customary to position a positioning plate against the back of the magnetic sheet on the opposite side from the magnetic head. The positioning plate has a groove opening toward the magnetic head so that the magnetic sheet contacting the magnetic head will be curved into the groove. Upon rotation of the magnetic sheet, the magnetic sheet is maintained in good contact with the magnetic head by the oositioning plate as well as by an air flow produced between the magnetic sheet and the positioning plate.

When no video signals are recorded on or reproduced from the magnetic sheet by the magnetic head, i.e., when the magnetic sheet is not rotated, however, the magnetic head remains held against the recording surface of the magnetic sheet. If the portion of the magnetic sheet which contacts the magnetic head should be left deformed for a long time, the contacting sheet portion will be subjected to plastic deformation. The deformed portion of the magnetic sheet will be liable to cause a recording or reproducing failure when the magnetic sheet is rotated to enable the magnetic head to record or reproduce the video signals.

One solution to the above difficulty would be to move the magnetic head vertically out of contact with the magnetic sheet when no video signals are to be recorded or reproduced while the magnetic sheet is in the loading position. Since the magnetic head is required to be kept in contact with the magnetic sheet with a high positioning accuracy, such a solution can be realized only by an arrangement which can move the lowered magnetic head upwardly to a desired position with an accuracy of a few micrometers.

SUMMARY OF THE INVENTION

In view of the aforesaid drawbacks of conventional magnetic recording and reproducing devices, it is an object of the present invention to provide a mechanism for lifting and lowering a magnetic head in a magnetic recording and reproducing device to bring the magnetic head into contact with a magnetic sheet with a high degree of accuracy and to prevent the magnetic sheet from being plastically deformed when not in use in the magnetic recording and reproducing device.

According to the present invention, at least one guide shaft rotatably supported on a frame has an eccentric portion, and a magnetic head carriage supporting a magnetic head thereon is slidably movable along the guide shaft toward a recording/playback position, the magnetic head carriage having an end held in engagement with the eccentric portion of the guide shaft. A driver mechanism is mounted on the frame for rotating the guide shaft to cause the eccentric portion to displace the magnetic head toward a positioning plate with a magnetic medium such as a magnetic sheet interposed therebetween.

The magnetic head can thus be moved into contact with the magnetic sheet with a high degree of accuracy by tilting the magnetic head carriage through rotation of the guide shaft. When no signals are to be recorded on or reproduced from the magnetic sheet through the magnetic head, the magnetic head carriage is tilted back to move the magnetic head away from the magnetic sheet. As a consequence, the magnetic sheet is free from undesirable plastic deformation which would otherwise be caused by pressure contact with the magnetic head while the magnetic sheet were held at rest. Being free from deformation, the magnetic sheet enables signals to be recorded and reproduced reliably.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
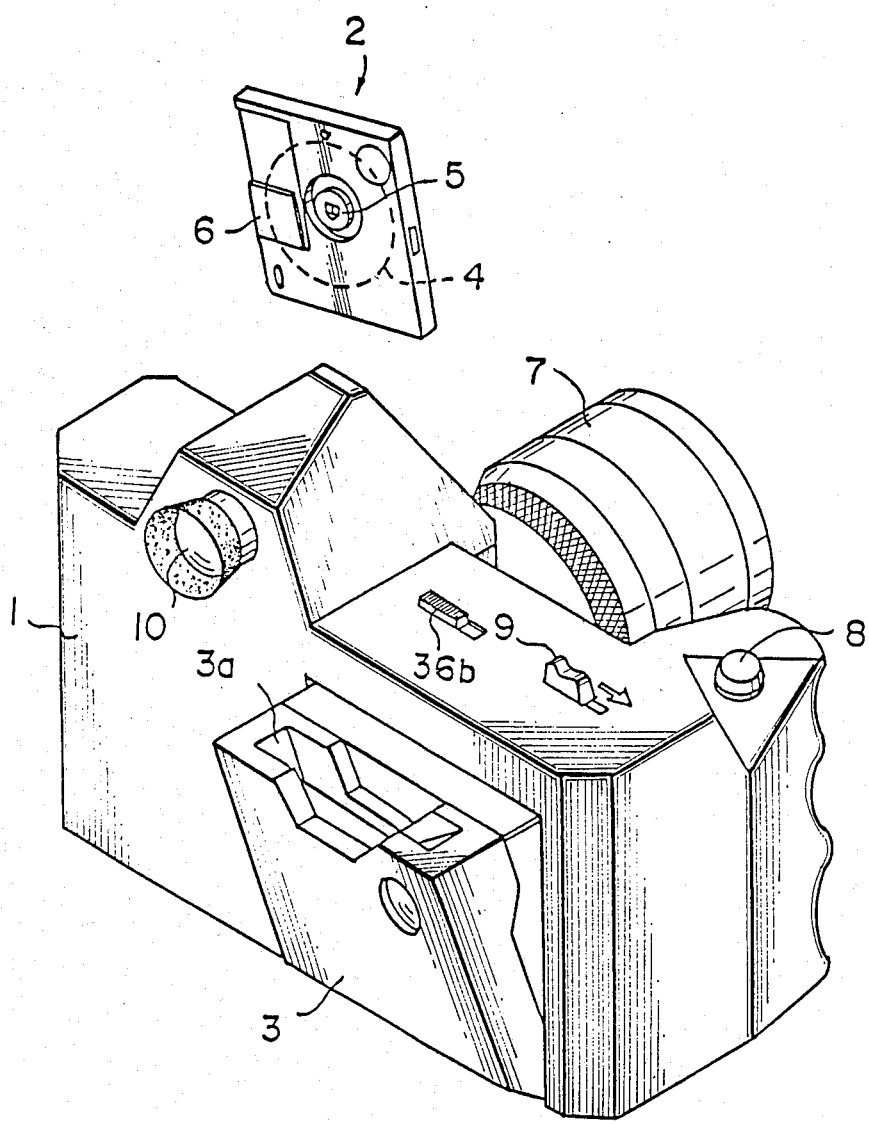
FIG. 1 is a perspective view of an electronic photographic camera in which the present invention is incorporated.

FIG. 1 shows an electronic photographic camera including a camera body 1 having a door 3 with its lower edge pivotally mounted on the camera body 1, the door 3 being openable and closable to place a magnetic sheet jacket 2 therein. The magnetic sheet jacket 2 includes a magnetic sheet 4 having a central core 5 and a slidable shutter 6. In loading the magnetic sheet jacket 2, the magnetic sheet jacket 2 is inserted into the door 3 through a gate 3a thereof while the door 3 is in the illustrated unloading position. Then, the door 3 is closed from the unloading position into a loading position in the camera body 1, in which the door 3 is locked against accidental opening. In the loaded condition, the magnetic sheet jacket 2 is securely positioned with respect to the camera body 1. The central core 5 of the magnetic sheet 4 is engaged and rotatably supported by a spindle 24a (FIG. 3) in the camera body 1, and the slidable shutter 6 is opened as the magnetic sheet jacket 2 is inserted. A magnetic head 11 and a positioning plate 12 (described later on) can approach the magnetic sheet 4 through an opening in the magnetic sheet jacket 2 which is uncovered by the shutter 6. As shown in FIG. 1, the camera also has a lens 7, a shutter release button 8, a slide button 9 for opening the door 3, and a viewfinder eyepiece 10.

Figure 2:
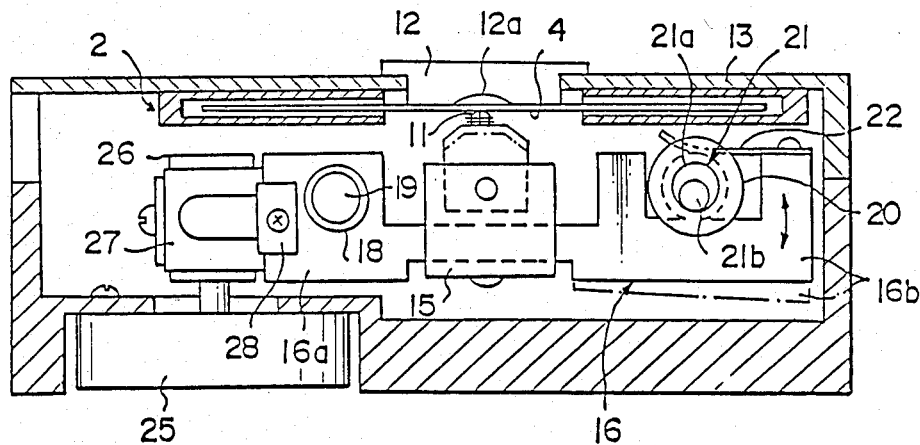
FIG. 2 is a cross-sectional view of a magnetic recording device and a mechanism for lifting and lowering a magnetic head according to the present invention.

When the magnetic sheet jacket 2 is loaded in the camera, the components of a magnetic recording device are positioned as illustrated in FIG. 2. When taking a picture, the magnetic head 11 is held in contact with the recording surface of the magnetic sheet 4 in the magnetic sheet jacket 2, and the positioning plate 12 contacts the opposite surface of the magnetic sheet 4, the positioning plate 12 having a groove 12a opening toward the magnetic head 11. While the magnetic sheet 4 is sandwiched between the magnetic head 11 and the positioning plate 12, the magnetic head 11 is pressed against a portion of the magnetic sheet 4 which is made to slightly curve into the groove 12a.

The positioning plate 12 is fixed to a positioning plate holder 13. The positioning plate 12 is movable into a direction for contacting the magnetic sheet 4 in response to angular movement of the positioning plate holder 13 at the time of loading the magnetic sheet jacket 2 into the camera.

Figure 3:
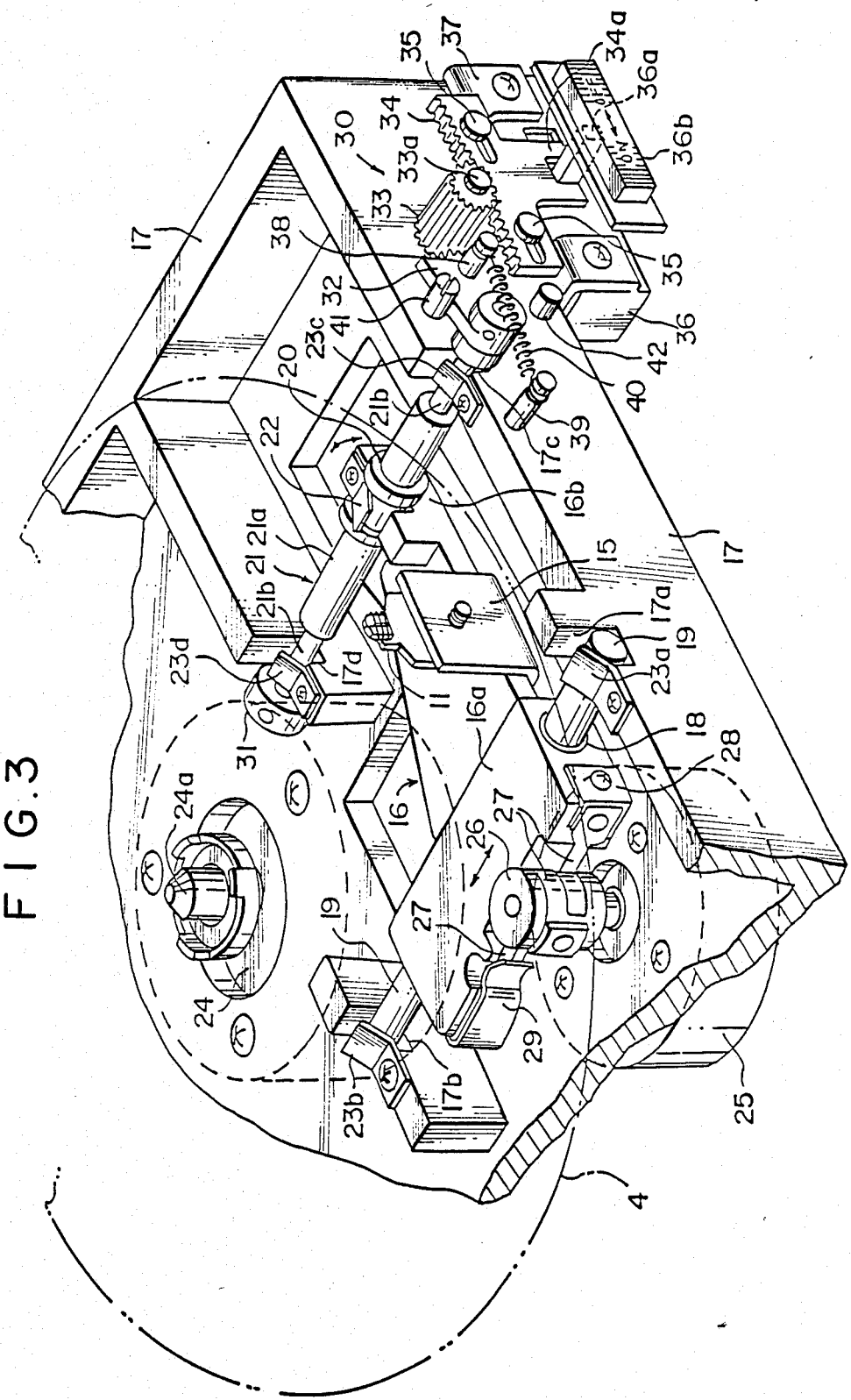
FIG. 3 is an enlarged fragmentary perspective view of the magnetic recording device and the mechanism for lifting and lowering the magnetic head illustrated in FIG. 2.

The magnetic head 11 is supported on a mechanism which is shown in FIGS. 2 and 3. The magnetic head 11 is fixed to a head holder 15 attached to a magnetic head carriage 16. The magnetic head carriage 16 has a base 16a slidably fitted over a first guide shaft 19 with a guide bushing 18 interposed therebetween and an opposite end 16b slidably fitted over a second guide shaft 21 with a guide bushing 20 interposed therebetween. Thus, the magnetic head carriage 6 is slidable along the first and second guide shafts 19, 21. The end 16b of the magnetic head carriage 6 is upwardly held against the guide bushing 20 mounted on the second guide shaft 21, and retained on the second guide shaft 21 by a carriage retainer spring 22 fastened to the end 16b and engaging the upper surface of the guide bushing 20.

The first and second guide shafts 19, 21 have axial ends supported in bearing recesses 17a through 17d defined in a frame 17, the axial ends being fixed in position by guide shaft holder springs 23a through 23d downwardly held against the axial ends of the first and second guide shafts 19, 21.

The magnetic head 11 is movable radially inwardly from the outer peripheral edge of the magnetic sheet 4, which has its central core 5 supported on and rotated at a high speed by the spindle 24a of a spindle motor 24 mounted on the frame 17. The magnetic head 11 is fed for tracking operation by a stepping motor 25 operatively coupled with the base 16a of the magnetic head carriage 16 by a steel belt 27. More specifically, the stepping motor 25 has an output shaft provided with a pulley 26 around which an intermediate portion of the steel belt 27 is wound and fixed. The steel belt 27 has its opposite ends fastened by belt brackets 28 (only one shown) to end surfaces of the base 16a. Rotation of the pulley 26 thus causes the magnetic head carriage 16 to move along the guide shafts 19, 21 through the action of the steel belt 27. The steel belt 27 is tensioned by a leaf spring 29 attached to the base 16a and pressed against the steel belt 27.

The magnetic head 11 can also be lifted and lowered into and out of contact with the magnetic sheet 4. The mechanism for lifting and lowering the magnetic head 11 includes the second guide shaft 21, which has an eccentric surface, and a driver mechanism 30 for rotating the second guide shaft 21. The mechanism operates to tilt the magnetic head carriage 16 about the first guide shaft 19 for lifting and lowering the magnetic head 11.

The second guide shaft 21 supporting the end 16b of the magnetic head carriage 16 includes a central portion 21a and axial end portions 21b, 21b supported respectively in the bearing recesses 17c, 17d defined in the frame 17. As shown in FIG. 2, the central portion 21a is eccentrically positioned with respect to the axial end portions 21b, 21b. One of the axial end portions 21b is provided with a thrust stopper 31, while a sector gear 32 of the driver mechanism 30 is secured to the other axial end portion 21b. The driver mechanism 30 includes a pinion 33 rotatably supported on a pinion shaft 33a mounted on the frame 17, the pinion 33 being held in mesh with teeth of the sector gear 32. The pinion 33 is also in mesh with a rack 34 slidably supported on two guide pins 35, 35 mounted on the frame 17. The rack 34 has a recess 34a in which a lever 36a of a slide switch 36 engages, so that the rack 34 can slide with sliding movement of the slide switch 36. The slide switch 36 is mounted on the frame 17 by a bracket 37. The lever 36a has an outer end fitted in the back of a slide button 36b slidably mounted on an outer panel of the camera body 1. The slide switch 36 doubles as a main switch used when a picture is taken by the electronic photographic camera. Thus, when the slide switch 36 is switched on, the spindle motor 24 and the stepping motor 25 are energized, and the magnetic head 11 is also energized to record video signals on the magnetic sheet 4.

As shown in FIG. 1, the slide button 36b may be mounted on the upper surface of the camera body 1 and be operatively coupled to the driver mechanism 30 through an arrangement different from that which is shown in FIG. 3, so that the second guide shaft 21 may be turned about its own axis in response to operation of the slide button 36b.

In operation, the slide switch 36 is moved to slide the rack 34 for thereby causing the pinion 33 to turn the sector gear 32. The second guide shaft 21 is therefore turned about its own axis to enable the eccentric central portion 21a thereof to be vertically moved with respect to the frame 17. Therefore, the end 16b of the magnetic head carriage 16 is moved vertically for a distance equal to the amount of eccentricity of the central portion 21a with respect to the axial end portions 21b, 21b, with the result that the magnetic head 11 can be moved toward and away from the magnetic sheet 4.

Figure 4:
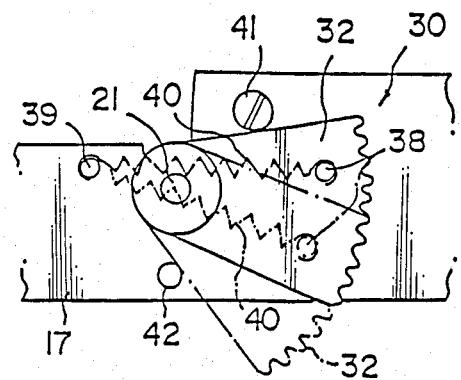
FIG. 4 is a fragmentary front elevational view showing the manner in which a driver mechanism operates to drive the mechanism for lifting and lowering the magnetic head.

As illustrated in FIGS. 3 and 4, a toggle spring 40 is coupled to a spring hanger pin 38 mounted on the sector gear 32 and another spring hanger pin 39 mounted on the frame 17 in a position which is substantially diametrically opposite to the spring hanger pin 38 across the second guide shaft 21. In the position of the sector gear 32 indicated by the solid lines in FIG. 4, the upper edge of the sector gear 32 abuts against an upper stopper pin 41 on the frame 17, with the magnetic head 11 in a lifted position. In this position, the toggle spring 40 has its central axis positioned between the second guide shaft 21 and the upper stopper pin 41 for urging the sector gear 32 to be held against the upper stopper pin 41. When the sector gear 32 is turned downwardly in response to operation of the slide switch 36, the sector gear 32 is brought to the dot-and-dash-line position in FIG. 4 in which the lower edge of the sector gear 32 engages a lower stopper pin 42 mounted on the frame 17 with the magnetic head 11 in a lowered position. The central axis of the toggle spring 40 is now displaced past the second guide shaft 21 toward the lower stopper pin 42 to bias the sector gear 32 to be pressed against the lower stopper pin 42.

The upper stopper pin 41 comprises an eccentric pin that can be turned to adjust the position in which the sector gear 32 is stopped in engagement with the upper stopper pin 41. Therefore, the upper stopper pin 41 is capable of adjusting the degree by which the magnetic head 11 curves the magnetic sheet 4 into the groove 12a.

The guide bushing 20 fitted over the second guide shaft 21 is movable relatively to the end 16b of the magnetic head carriage 16 toward the first guide shaft 19 in order to allow radial movement of the eccentric portion 21a upon rotation of the second guide shaft 21.

Operation of the mechanism for lifting and lowering the magnetic head 11 is as follows: When the magnetic sheet jacket 2 is inserted through the door 3 into the loading position, the slide switch 36 is in the OFF position and the magnetic head 11 is lowered out of contact with the magnetic sheet 4. The slide switch 36 is then shifted to the ON position to angularly move the sector gear 32. When the toggle spring 40 traverses the center of the second guide shaft 21, the sector gear 32 is turned under the resiliency of the toggle spring 40 into abutment against the upper stopper pin 41. As a consequence, the end 16b of the magnetic head carriage 16 is tilted upwardly (FIGS. 2 and 3) to lift the magnetic head 11 to a prescribed height, thereby bringing the tip of the magnetic head 11 into contact with the recording surface of the magnetic sheet 4. The magnetic head 4 pushes the magnetic sheet 4 upwardly to press the back thereof against the positioning plate 12.

When a picture is to be taken, the shutter release button 8 is depressed to enable the magnetic head 11 to record one field of video signals successively on concentric tracks on the recording surface of the magnetic sheet 4 which is rotated at 3,600 rpm by the spindle motor 24. The rotation of the magnetic sheet 4 induces an air flow between the magnetic sheet 4 and the positioning plate 12. The speed of the air flow is reduced in the groove 12a, resulting in an air pressure buildup in the groove 12a so that the magnetic sheet 4 is pressed against the magnetic head 11, thus improving the contact therewith.

Where no picture is to be taken for a long period of time, the slide switch 36 is shifted to the OFF position to turn the sector gear 32 in the opposite direction. The magnetic head carriage 16 is tilted downwardly to allow the magnetic head 11 to descend away from the recording surface of the magnetic sheet 4. The back of the magnetic sheet 4 is also brought out of contact with the positioning plate 12. Therefore, when the spindle motor 24 is de-energized and the magnetic sheet 4 is not rotated, the magnetic sheet 4 is free from unwanted plastic deformation which would otherwise result from contact with the magnetic head 11 when the magnetic sheet 4 is held at rest. As the magnetic sheet 4 is protected from plastic deformation, it can record and reproduce video signals with desired characteristics.

In the illustrated embodiment, the magnetic head carriage 16 is slidably supported on the two parallel guide shafts 19, 21. However, the magnetic head carriage may be supported at one end thereof by a single guide shaft having an eccentric surface with the other end slidably supported and held at a fixed height. Such a modified magnetic head carriage may be lifted and lowered by turning the guide shaft, and also may be moved for tracking operation.

The driver mechanism 30 for lifting and lowering the magnetic head 11 is mechanically coupled to the slide switch 36 so that no electric energy will be consumed in lifting and lowering the magnetic head 11 to thereby reduce battery consumption. However, the second guide shaft 21 may be driven to turn about its axis by an electrically operable actuator.

The driver mechanism 30 is not limited to the illustrated arrangement, and may be appropriately modified. The driver mechanism 30 need not be operatively coupled to the slide switch 36. More specifically, a rotary switch may be employed as the main switch in place of the slide switch 36, and the rotary main switch may have its shaft coupled directly to the pinion 33. The main switch may alternatively comprise a three-position slide switch such that the spindle motor 24 can be energized when the knob is in a first switch position and the magnetic head 11 can be lifted into contact with the magnetic sheet 4 when the knob is in a second switch position, for thereby enabling the magnetic head 11 to contact the magnetic sheet 4 while the latter is being rotated. This arrangement can protect the magnetic sheet 4 against damage known as head crash which would be caused to its recording surface by rotating or stopping the magnetic sheet 4 with the magnetic head 11 contacting the same.

While the foregoing embodiment has been described as being incorporated in the magnetic recording device of an electronic photographic camera, the mechanism of the present invention can be incorporated in other magnetic recording and reproducing apparatuses which employ a magnetic sheet as a magnetic medium.

Although a certain preferred embodiment has been shown and described, it should be understood that many changes and modifications may be made therein without departing from the scope of the appended claims.

What is claimed is:

1. A mechanism for lifting and lowering a magnetic head in a magnetic recording and reproducing device, comprising:

(i) a frame;

(ii) a first guide shaft supported on said frame, and a second guide shaft rotatably supported on said frame and having an eccentric portion;

(iii) a magnetic head carriage supporting a magnetic head thereon and slidably movable along said guide shafts toward a recording/playback position, drive means operably connected to said carriage for sliding said carriage along said guide shafts, said magnetic head carriage having an end held in engagement with said eccentric portion of said second guide shaft.

(iv) a positioning plate mounted on said frame; and (v) a driver mechanism mounted on said frame for rotating said second guide shaft to cause said eccentric portion to display said magnetic head carriage and rotate said magnetic head carriage about said first guide shaft toward said positioning plate whereby a magnetic medium interposed between said positioning plate and said magnetic head permits transducing contact between a magnetic medium and said magnetic head.

2. A mechanism according to claim 1, further including a switch mechanically coupled to said driver mechanism for operating the driver mechanism in response to actuation of said switch.

3. A mechanism accordig to claim 2, wherein said driver mechanism comprises a sector gear fixed to said second guide shaft, a pinion rotatably mounted on said frame, a rack slidably mounted on said frame and held in mesh with said pinion, and a toggle spring acting between said frame and said sector gear for urging said sector gear to be angularly moved with said second guide shaft toward a selected one of two spaced positions dependent on the angular movement of said sector gear, said switch comprising a slide switch mounted on said frame and coupled to said rack for sliding the same.

4. A mechanism according to claim 3, wherein said driver mechanism includes a first stopper pin mounted on said frame for engaging said sector gear to stop the same in one of said spaced positions, and a second stopper pin mounted on said frame for engaging said sector gear to stop the same in the other of said spaced positions.

5. A mechanism according to claim 1, wherein said second guide shaft has a pair of axial end portions rotatably supported in respective recesses defined in said frame, said eccentric portion comprising a central portion of said second guide shaft positioned axially between said axial end portions and eccentric with respect thereto.

6. A mechanism according to claim 1, wherein said first guide shaft extends parallel to said second shaft, said magnetic head carriage having an opposite end slidably supported on said first shaft.

* * * * *